United States Patent Office 2,730,520
Patented Jan. 10, 1956

2,730,520

COPOLYMER OF FATTY ACID AND ROSIN ACID

Kirtland E. McCaleb, Minneapolis, Minn., assignor to General Mills, Inc., a corporation of Delaware No Drawing. Application January 14, 1952,
Serial No. 266,449

4 Claims. (Cl. 260—97)

The present invention relates to a copolymer of fatty acid and rosin acid which is useful as a substitute for other polybasic acids in the preparation of varnishes, alkyd resins, and the like.

It is therefore an object of the present invention to provide a novel copolymer of fatty acid and rosin acid, and to provide a process of producing such copolymer.

The copolymer of rosin acid and fatty acid may be prepared by reacting a mixture of rosin acid and unsaturated higher fatty acids with a very active catalyst, such as a combination of phosphoric acid and gaseous boron trifluoride. The rosin-fatty acid mixture may be any of a wide variety. Thus unsaturated higher fatty acids containing from 8 to 18 carbon atoms, and rosin may be mixed in any proportion as long as there is a substantial quantity of each of the constituents. Usually from 20–80% of rosin should be employed, with the balance unsaturated higher fatty acid. The unsaturated higher fatty acid may be any single isolated fatty acid, or may be the mixed fatty acids of a drying or semi-drying oil, such as linseed, tung, perilla, oiticica, soy, and the like. The fatty acids may likewise be any selected fraction of the fatty acids of such a drying or semi-drying oil.

Instead of preparing a mixture of rosin and fatty acids from rosin and fatty acid, it is possible to employ tall oil or a selected fraction of tall oil. In the conventional recovery of fatty acids from tall oil there is produced a rosin acid fraction containing from about 60% to about 80% rosin with the balance being composed principally of fatty acids and a minor amount of unsaponifiable material. This rosin acid fraction is available at a low cost and accordingly it is preferred to employ this mixture for the preparation of the copolymer.

The catalyst which has been found very effective for this reaction is made by saturating a concentrated phosphoric acid, for example 85% phosphoric acid, with gaseous boron trifluoride. The reaction is carried on by heating the mixture of acids and catalyst at temperatures within the approximate range of 75–100° C. for periods of from 30 minutes to 2 hours. The product contains approximately 50% of the copolymer of rosin acid and fatty acid. The product may be stripped to remove monomeric material and leave the polymer as a brittle resin. As an alternative, the whole product may be used as is in the formulation of varnishes, alkyds, and the like.

EXAMPLE 1

500 grams of a rosin acid fraction obtained by the fractional distillation of tall oil (containing 65% rosin acid, 30% fatty acid which is approximately one-half linoleic acid, and the balance unsaponifiable material), were melted under a nitrogen atmosphere in a two-liter, three-necked, round-bottom flask equipped with a mechanical stirrer, a thermometer, and a nitrogen inlet tube. An outlet tube led from the flask through a gas trap filled with barium hydroxide solution. When the rosin fraction had all melted, the nitrogen inlet was replaced by a dropping funnel containing 100 g. of a liquid catalyst prepared by saturating 85% phosphoric acid with boron trifluoride. This liquid catalyst was added to the stirred reaction mixture over a period of 10 minutes without external heating, during which time the temperature varied between 75° C. and 100° C. When the addition was completed, the reaction mixture was stirred for 30 minutes at 95–100° C. The dark brown viscous product was cooled, treated with water and benzene, and the resulting benzene solution was washed with water until free of mineral acid, dried over anhydrous sodium sulfate, and stripped of the benzene under vacuum. The residual viscous red-brown liquid can be used as such in varnish formulations, and the like.

The product was identified as follows: a sample of the above residual viscous red-brown liquid was distilled under high vacuum to give 50% recovery of monomeric material and 50% of an undistillable residue (at 270° C. and 0.5 mm. pressure) which was found to contain both rosin acid and fatty acid groups by the selective esterification procedure. This polymer exhibited a molecular weight of 835 (ebullioscopic in acetone) which is considerably above that of dimeric rosin acid or fatty acid. The product is largely composed of a copolymer of one or more rosin acid molecules with one or more fatty acid molecules, resulting from various reactions at the unsaturated centers of these molecules.

The residual viscous red-brown liquid product of the above example was esterified with pentaerythritol using xylene as the azeotrope. The initial acid number of the copolymer was 131. The esterification was carried out for 7 hours at 265–270° C., at the end of which time the acid number had been reduced to 23.4. Then more pentaerythritol was added and the mixture heated another seven hours to get a product with an acid number of 6.7. The esterified copolymer was reduced with mineral spirits to 50% solids, and 0.3% Pb and 0.03% Co were added as naphthenates. Films were cast from this composition, and the drying properties, alkali and water resistance, and hardness values are as follows:

*Drying rate*

| Set | Set Dry | Lint Free | After 8 hours |
|---|---|---|---|
| 15 min. | 30 min. | 40 min. | v. sl. tack |

*Alkali and water resistance, 1% NaOH*

| 24 hrs. | 48 hrs. | 78 hrs. |
|---|---|---|
| O. K. | O. K. | sl. blush |

*Water*

| 24 hrs. | 48 hrs. | 78 hrs. |
|---|---|---|
| O. K. | O. K. | sl. blush |

Rocker hardness after 24 hours—18

I claim as my invention:

1. Process of producing a rosin acid-unsaturated fatty acid copolymer, which comprises heating a mixture of rosin acids and unsaturated higher fatty acids to a temperature within the approximate range of 75–100° C. in the presence of a phosphoric acid-boron trifluoride catalyst.

2. Process of producing a rosin acid-unsaturated fatty acid copolymer, which comprises heating a mixture of rosin acids and unsaturated higher fatty acids to a temperature within the approximate range of 75–100° C. in the presence of a catalyst composed of a saturated solution of boron trifluoride in 85% phosphoric acid.

3. Product produced according to the process of claim 1.

4. Product produced according to the process of claim 2.

References Cited in the file of this patent

UNITED STATES PATENTS

| | | |
|---|---|---|
| 2,120,015 | Borglin | June 7, 1938 |
| 2,280,247 | McKee | Apr. 21, 1942 |
| 2,310,374 | Rummelsburg | Feb. 9, 1943 |
| 2,424,026 | Gilbert | July 15, 1947 |